United States Patent [19]

Cowan

[11] Patent Number: 5,551,301
[45] Date of Patent: Sep. 3, 1996

[54] PIEZORESISTIVE PRESSURE TRANSDUCER CIRCUITRY ACCOMMODATING TRANSDUCER VARIABILITY

[75] Inventor: Mark W. Cowan, Fremont, Calif.

[73] Assignee: Cardiometrics, Inc., Mountain View, Calif.

[21] Appl. No.: 492,397

[22] Filed: Jun. 19, 1995

[51] Int. Cl.⁶ .................................................. G01L 19/04
[52] U.S. Cl. ............................ 73/708; 73/721; 73/727; 364/571.03; 128/675
[58] Field of Search ...................... 73/708, 721, 727, 73/726, 765, 766, 862.622, 862.623; 364/571.01, 571.02, 571.03; 128/672, 675

[56] References Cited

U.S. PATENT DOCUMENTS

| | | | |
|---|---|---|---|
| 3,847,017 | 11/1974 | Watts | 73/765 |
| 4,337,665 | 7/1982 | Sato et al. | 73/766 |
| 4,576,052 | 3/1986 | Sugiyama | 73/862.63 |
| 4,715,003 | 12/1987 | Keller et al. | 364/571 |
| 5,012,436 | 4/1991 | Burri | 364/571.02 |
| 5,146,788 | 9/1992 | Raynes | 73/708 |
| 5,193,393 | 3/1993 | Czarnocki | 73/708 |
| 5,460,050 | 10/1995 | Miyano | 73/766 |

FOREIGN PATENT DOCUMENTS 62-218813  9/1987  Japan ........................ 73/708

Primary Examiner—Richard Chilcot
Assistant Examiner—Paul D. Amrozowicz
Attorney, Agent, or Firm—Flehr, Hohbach, Test, Albritton & Herbert

[57] ABSTRACT

Piezoresistive pressure transducer circuitry accommodating transducer variables comprising microminiature pressure transducer having first and second variable resistive elements each having first and second ends, circuitry coupled to the first and second resistive elements of the transducer including third and fourth fixed resistive elements each having a first and second ends, means interconnecting the first ends of the first and second resistive elements, means interconnecting the second ends of the first and third resistive elements, means interconnecting the second ends of the second and fourth resistive elements, means interconnecting the first ends of the third and fourth resistive elements, means for supplying excitation to the first ends of the third and fourth resistive elements, first amplifier means having an input coupled to the means interconnecting the second ends of the first and third resistive elements, second amplifier means having an input coupled to the means interconnecting the second ends of the second and fourth resistive elements. First analog-to-digital converter having an input coupled to the output of the first amplifier means, a second analog-to-digital converter having an input coupled to the output of the second amplifier means, a computer and means coupling the computer to the outputs of the first and second analog-to-digital converters.

15 Claims, 1 Drawing Sheet 5,551,301

PIEZORESISTIVE PRESSURE TRANSDUCER CIRCUITRY ACCOMMODATING TRANSDUCER VARIABILITY

This invention relates to a piezoresistive transducer circuitry accommodating transducer variability and having reduced dynamic range requirements.

Conventional pressure transducer systems, both strain gauge and piezoresistive types, typically utilize a balanced Wheatstone bridge-type circuit between two variable and two fixed resistive elements. The transducer itself may contain only the two variable resistive elements or all four resistive elements. Typically the resistive elements are trimmed during manufacture to ensure a close tolerance to and match between the nominal zero-pressure resistance values. The resistive elements are also trimmed to provide a close match between individual pressure-resistance characteristics. Electrical circuitry typically utilized therewith permits a small adjustment to the value of one of the fixed resistors by adding a small offset voltage to one of the output legs of the bridge. The demodulated amplified output can then be supplied to an analog-to-digital converter. With such circuitry, typically the dynamic range of the amplified signal is matched to the input of the analog-to-digital converter and only 9 bits (1 part in 512) of resolution is needed in the analog-to-digital converter to provide adequate pressure resolution (resolution better than 1 mmHg from 0–300 mmHg or over a 0–300 mmHg span as typically required for human blood pressure measurements). With the advent of ultraminiature pressure sensors such as that disclosed in the co-pending application Ser. No. 08/300,445 filed on Sep. 2, 1994, it has been found that the conventional Wheatstone circuitry of the type hereinbefore described is incapable of assimilating the various characteristics of such ultraminiature pressure sensors such as insensitivity to pressure, variability of resistor values, sensitivity to temperature, and with pressure sensitivity decreasing inversely with temperature increases. There is therefore need for a new and improved circuitry for use with such ultraminiature pressure sensors which can accommodate such variabilities.

In general, it is an object of the present invention to provide piezoresistive pressure transducer circuitry and method accommodating transducer variability.

Another object of the invention is to provide circuitry which makes it possible to measure the pressure component and the temperature component of the change in resistance of each variable resistor.

Another object of the invention is to provide a circuitry and method of the above character which makes it possible to make independent measurements of the variable resistors as well as differential measurements.

Another object of the invention is to provide circuitry and method of the above character which has reduced dynamic range requirements.

Another object of the invention is to provide circuitry and method of the above character which makes use of easily obtainable inexpensive components.

Another object of the invention is to provide circuitry and method of the above character in which a computer can be utilized to compensate for variability in the resistors.

Another object of the invention is to provide circuitry and method of the above character which can compensate in real time for undesired characteristics of the transducer.

Another object of the invention is to provide circuitry and method of the above character in which the dynamic range requirements have been reduced by computer generated feedback in real time.

Additional objects and features of the invention will appear from the following description in which the embodiments are set forth in detail in conjunction with the accompanying drawings.

In general the circuitry incorporating the present invention is for use with an ultraminiature piezoresistive pressure transducer having first and second resistive elements, each having first and second ends. The circuitry comprises third and fourth resistive elements each having first and second ends. Means is provided for connecting the first ends of the first and second resistive elements. Means is provided for connecting the second ends of the first and third resistive elements. Means is also provided for connecting the second ends of the second and fourth resistive elements. Means is provided for connecting the first ends of the third and fourth resistive elements. Excitation means is provided which is connected to the first ends of the third and fourth resistive elements. First amplifier means is provided having an input coupled to the means for connecting the second ends of the first and third resistive elements. Second amplifier means is provided having an input coupled to the means for connecting the seconds ends of the second and fourth resistive elements. First and second analog-to-digital converters are connected respectively to the outputs of the first and second amplifier means. Computer means is connected to the first and second analog-to-digital converters for making adjustments in real time to take into account the variabilities of the first and second resistive elements and to perform calculations to result in an output which represents the pressure being measured by the ultraminiature piezoresistive pressure transducer.

Figure 1:
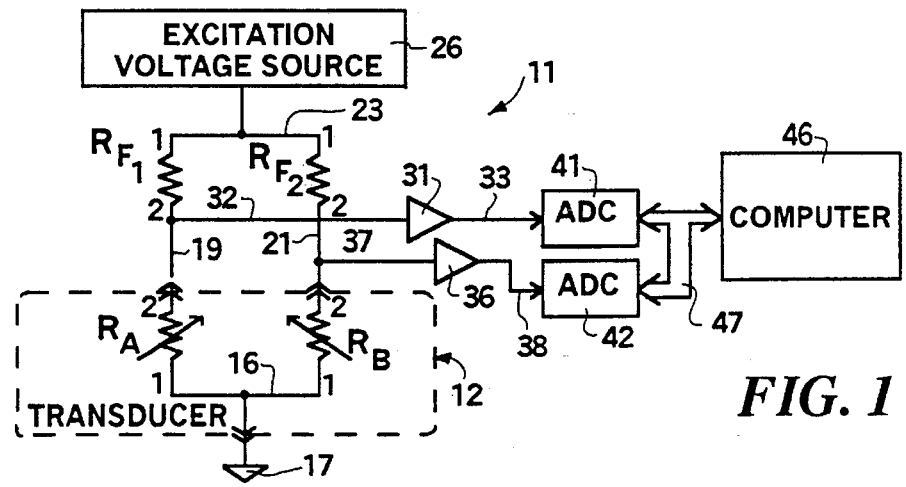
FIG. 1 is a schematic block diagram of a modified bridge circuit incorporating the present invention in use with an ultraminiature pressure transducer.

More in particular as shown in FIG. 1 of the drawings, the circuitry 11 incorporating the present invention is for use with a ultraminiature piezoresistive pressure transducer 12. The pressure transducer 12 is of the type described in copending application Ser. No. 08/300,445 filed on Sep. 2, 1994. As described therein, the transducer 12 is sized so that it can be mounted on the distal extremity of a flexible elongate element such as a guide wire having a diameter of 0.018" and less. The guide wire is for use in diagnostic and therapeutic procedures using catheters and in which the catheters are utilized with such a guide wire, as for example in an angioplasty procedure. The piezoresistive transducer is mounted in a pressure sensor assembly which incorporates the piezoresistive transducer in a diaphragm structure formed of a suitable crystalline material such as silicon and is fabricated from a die having a length of 1050 microns and width of 250 microns for a 0.014" guide wire, and a width between 250 and 350 microns for a 0.018" guide wire and thickness of 50 microns. First and second resistive elements are formed in the die as described in said pending application Ser. No. 08/300,445 filed on Sep. 2, 1994. These two variable resistors identified as variable resistors $R_A$ and $R_B$ are provided with first and second ends identified by the numerals of 1 and 2. The two resistive elements $R_A$ and $R_B$ are configured so they extend over a flexible silicon diaphragm which upon the application of pressure to diaphragm causes one resistive element to increase in resistive value while the other resistive element decreases in value. Typical characteristics for such a piezoresistive pressure transducer which are involved in the design of the circuitry of the present invention include:

| | |
|---|---|
| Nominal resistance, each resistor | 3500Ω ± 1000Ω |
| Pressure sensitivity ($K_P$) | 1.25Ω to 15Ω/1000Ω/100 mmHg |
| Temperature coefficient of resistance ($K_T$) | +28% ± 7.5%/100° C. |
| Temperature coefficient of pressure sensitivity ($K_S$) | −20% ± 7.5%/100° C. |
| Matching between resistors | None |
| Optimal resistor power dissipation (each resistor) | 0.035 to 0.07 mW |

From the above specifications, it can be seen that the sensitivity of such an ultraminiature piezoresistive transducer to pressure can be equal to, in the best case, or in the worst case, approximately 20 times less than the temperature sensitivity, an unwanted characteristic.

In accordance with the present invention the voltage across each transducer resistor $R_A$ and $R_B$ must be measured independently. Both measurements are needed to simultaneously solve two equations, each having two unknowns P (pressure) and T (temperature). Other parameters of the transducer, including the nominal resistance $R_1$, and the sensitivity factors $K_P$, $K_T$, and $K_S$, must be known and are typically measured during the manufacturing calibration process.

The circuitry for accomplishing this is shown in FIG. 1 and includes two external fixed resistors $R_{F1}$ and $R_{F2}$, each having first and second ends identified as 1 and 2. As shown in FIG. 1, means in the form of a conductor 16 is provided for connecting the first ends of the first and second variable resistive elements $R_A$ and $R_B$ which are connected through a return path to a ground 17. Means in the form of a conductor 19 is provided for connecting the second end of the first variable resistor $R_A$ and the second end of the first fixed resistor $R_{F1}$ to form a first junction. Means in the form of a conductor 21 is provided for connecting the second end of the variable resistor $R_B$ to the second fixed resistor $R_{F2}$ to form a second junction. Means in the form of a conductor 23 is provided for connecting the first end of the first fixed resistor $R_{F1}$ to the first end of the second fixed resistor $R_{F2}$ and are connected to an excitation voltage source 26. A first independent amplifier means 31 is provided which has its input connected by a conductor 32 to the conductor 19 and is provided with an output 33. A second separate and independent amplifier means 36 has an input connected by a conductor 37 to the conductor 21 and has an output 38. First and second analog-to-digital converters 41 and 42 are provided which are connected respectively to the outputs 33 and 38 of the amplifiers 31 and 36. A computer 46 is provided which is connected to the analog-to-digital converters 41 and 42 through a communication link 47 as shown in FIG. 1 for reading the digitized voltages from the analog-to-digital converters 41 and 42 and computing therefrom the pressure being measured by the transducer 12. The computer can be of a suitable type such as a 16-bit microprocessor.

From the foregoing description it can be seen that two independent amplifiers 31 and 36 are utilized to feed the signals to two independent analog-to-digital converters which are connected to the computer 46. This makes it possible to provide the information which is needed to solve simultaneously two equations with two unknowns. Each voltage measured has a pressure component and a temperature component. By measuring these two components individually, it is possible to perform the necessary calculation for the simultaneous equations to resolve both parameters as set forth below.

As soon as each voltage has been measured, the variable resistances $R_A$ and $R_B$ can be calculated when the excitation voltage and the values of the fixed resistors $R_{F1}$ and $R_{F2}$ are known. The temperature-compensated pressure value may then be computed as follows. At any instant, the transducer resistance R (for each resistor) is a function of six parameters: the initial resistance $R_1$ at the calibration temperature and pressure; the applied pressure P; the pressure sensitivity $K_P$; the temperature T; the temperature coefficient of the resistance $K_T$; and the temperature coefficient of the pressure sensitivity $K_S$. The equation to express this function is:

$$R = R_1 + K_T T + (K_P P)(1 - K_S T)$$

Of the above variables, all are known except P and T, but since the measurements of the two independent resistors (each with its own $R_1$, $K_T$, $K_P$, and $K_S$), have been ascertained, two equations as above for $R_A$ and $R_B$ can be solved for P and T. This is done by solving for P in terms of only one of the resistors and its parameters, and solving for T in the terms of the other:

$$P = \frac{RA - R1(A) - KT(A)T}{KP(A) - KP(A)KS(A)T},$$

and $$T = \frac{RB - R1(B) - KP(B)P}{KT(B) - KP(B)KS(B)P}$$

Then the equation for T is substituted into the equation for P. Solving the resulting equation for P results in a quadratic equation, having the solution:

$$P = \frac{(DE + BF - CG - AH) \pm \sqrt{(CG - DE + AH - BF)^2 - 4(DF - CH)(BE - AG)}}{2(DF - CH)}$$

into which, for brevity, the following terms have been substituted:

$$A = (R_A - R_{1(A)})$$
$$B = K_{T(A)}$$
$$C = K_{P(A)}$$
$$D = (K_{P(A)} \cdot K_{S(A)})$$
$$E = (R_B - R_{1(B)})$$
$$F = K_{P(B)}$$
$$G = K_{T(B)}$$
$$H = (K_{P(B)} \cdot K_{S(B)})$$

From the foregoing it can be seen that the temperature compensated pressure value for the ultraminiature piezoresistive transducer 12 can be ascertained. However, in addition, to meet the requirements of practical and inexpensive circuitry operating with such ultraminiature piezoresistive transducer there is a great need to reduce the dynamic range requirements (the span between the smallest and largest signals) of such ultraminiature piezoresistive transducer. By way of example, utilizing an ultraminiature piezoresistive transducer 12 of the type described in co-pending application Ser. No. 08/300,445 filed on Sep. 2, 1994 having the transducer characteristics as set forth above, the pressure signal from a low sensitivity transducer with a nominal excitation voltage of one volt over the pressure range 0 to 300 mmHg, can be calculated as 836 μV, or 2.8 μV/mmHg. The maximum signal generated by the extremes of the ultraminiature piezoresistive transducer characteristics over the required pressure and temperature ranges, will be approximately 190 mV (most of this coming from the variance of the transducer resistance from the ideal 3500Ω). Thus, to resolve to 1 mmHg, it is necessary to resolve as a minimum, 1 part in 68000 (190 mV/2.8 μV). If an analog-to-digital converter is utilized to digitize this signal, an accuracy of 17 bits is minimum. To provide conventional circuitry which could be utilized with such low sensitivity transducers would be very expensive at best. Great amplification would be required which would also amplify the offset voltages. It would be difficult to provide amplifiers having sufficient dynamic range. Even if that were possible, it would be necessary to provide analog-to-digital converters also having a large dynamic range in order to resolve the pressure signal from the very large offset voltage. Circuitry to overcome the above identified difficulties providing for a reduction of analog-to-digital converter dynamic range requirements is set forth in FIG. 2.

Figure 2:
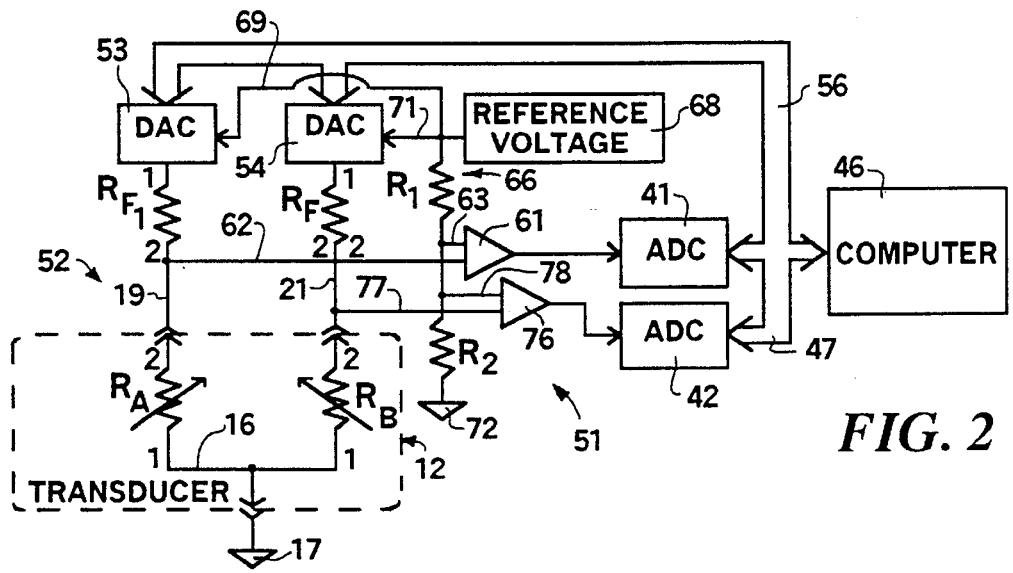
FIG. 2 is a schematic block diagram of another modified bridge circuit incorporating the present invention for use with an ultraminiature pressure transducer which makes possible a dramatic reduction in analog-to-digital converter dynamic range requirements.

The circuitry 51 shown in FIG. 2 incorporates a bridge arrangement similar to that shown in FIG. 1 with the variable resistors $R_A$ and $R_B$ in the transducer 12 and with external fixed resistors are $R_{F1}$ and $R_{F2}$, but in which the connector 23 has been eliminated along with the excitation voltage source 26. The excitation voltage for the bridge 52 has been split and the excitation is provided by two separate digital-to-analog converters 53 and 54 with digital-to-analog converter 53 being connected to the first end of the first fixed resistor $R_{F1}$ and the digital-to-analog converter 54 being connected to the first end of the second fixed resistor $R_{F2}$. These digital-to-analog converters 53 and 54 are controlled by a communication link 56 from the computer 46.

In place of the independent amplifier 31 there has been provided a high input impedance differential amplifier 61 which has one input connected by conductor 62 to the conductor 19. It also has another input connected by a conductor 63 to a resistor voltage divider network 66 which is connected to a reference voltage source 68. The reference voltage source 68 provides a suitable voltage as for example 2.500 volts to the resistive divider network 66 and to the digital-to-analog converter 53 by conductor 69 and to the digital-to-analog converter 54 by the conductor 71. The resistive divider network 66 consists of serially connected resistors $R_1$ and $R_2$ which are connected to a ground 72 as shown. It supplies a suitable reference voltage as for example 0.5 volt to the other input of the differential amplifier 61.

In a similar manner, the differential amplifier 76 is substituted for the independent amplifier 36 and has its input connected by a conductor 77 to the conductor 21. The other input of the differential amplifier is connected by conductor 78 to the divider network 66, and is also supplied with a suitable reference voltage as for example 0.5 volts from the divider network 66.

Each independent differential amplifier 61 and 76 utilizes two operational amplifiers to provide a very high input impedance, as for example $10^{14}$ ohms. Suitable operational amplifiers having low noise and low offset voltages are available at moderate cost from many manufacturers. The analog-to-digital converters 41 and 42 can be two-channel types which in addition to measuring the outputs of each of the differential amplifiers 61 and 76, can measure simultaneously the excitation voltages produced by the digital-to-analog converters 53 and 54. These additional channels make it possible to perform self test and calibration of the circuitry when the circuitry is in use.

The differential amplifiers 61 and 72 have as one of their inputs as described above, a precision-generated offset voltage of 0.5 volt corresponding to the reference supplied by the reference voltage source 68. This offset voltage is subtracted from the transducer voltage, which is a function of the excitation voltage, which in turn is precisely generated by the computer 46 controlled digital-to-analog converters 53 and 54 to obtain nominally a transducer voltage of 0.5 volts. Thus, when the transducer 12 has been set up properly by the computer 46, and wherein nominal temperature or pressure is being applied to the transducer, each input to the differential amplifier is 0.5 volt and the output of the differential amplifier is 0 volts. Thus, a signal in the output of the differential amplifiers 61 and 76 is due to either a pressure or temperature change being sensed by the transducer 12. As soon as the temperature is determined, the computer 46 is capable in real time of compensating the excitation voltage to eliminate the temperature component of the transducer signal so that the only output from the differential amplifiers 61 and 76 will be those which represent the pressure being measured by the transducer 12. By compensating for the offset and temperature voltage component of the transducer signal, it is possible to use very high gain amplification of the pressure component of the signal. This is an important factor because typically the pressure component of signal may be a thousand times smaller than the combined offset and temperature voltage components. It is for that reason that all or substantially all of the offset and temperature voltage components must be subtracted prior to the large amplification of the signal.

From the foregoing it can be seen that with a separate excitation voltage generated by the computer controlled digital-to-analog converters 53 and 54 driving each leg of the bridge 52 it is possible for the computer 46, knowing the nominal resistance for each transducer element, to set the excitation voltage so that the offset due to the difference between the transducer resistance from the ideal resistance $R_F$ (3500 ohms) is cancelled out. Thus, at a nominal pressure and temperature, there will be essentially a zero-volt input to the analog-to-digital converters 41 and 42. When this is the case, the analog-to-digital converter input can meet the resolution requirements over the smaller dynamic range that results from only the temperature and pressure signals. For the same transducers and operating conditions used in the above example, the overall input dynamic range is reduced to only 45 mV. As an added benefit, since the present invention normalizes the resistance of the worst-case transducer to that of the ideal transducer by adjusting the excitation voltage as a function of the actual resistance, the effective sensitivity of the worst-case transducer is increased to 3.35 μV/mmHg. The result is that it is only necessary to resolve 1 part in 13400 (45 mV/3.35 μV), better than a four-fold improvement, thus making the capabilities of a 15 bit analog-to-digital converter adequate.

In the circuitry shown in FIG. 2, the computer 46 can also perform real time tracking of the temperature component of the signal and continually adjust the excitation voltages to compensate for temperature changes. The output dynamic range in this case would only be as great as the pressure signal produced by the most sensitive transducer, or about 13 mV. This requires accurate measurement to only 1 part in 3900 (13 mV/3.35 μV), which can be measured with a 12-bit analog-to-digital converted and represents a decrease in dynamic range by a factor more than 17 with respect to prior art approaches.

Thus, with the circuitry shown in FIG. 2, compensation is provided by the computer 46. Compensation is provided by varying independently the excitation voltage to each variable resistor $R_A$ and $B_B$ of the transducer 12 as a function of both the initial resistance and temperature so that the nominal transducer output voltage matches the fixed amplifier reference voltage supplied by the reference source 68.

Figure 3:
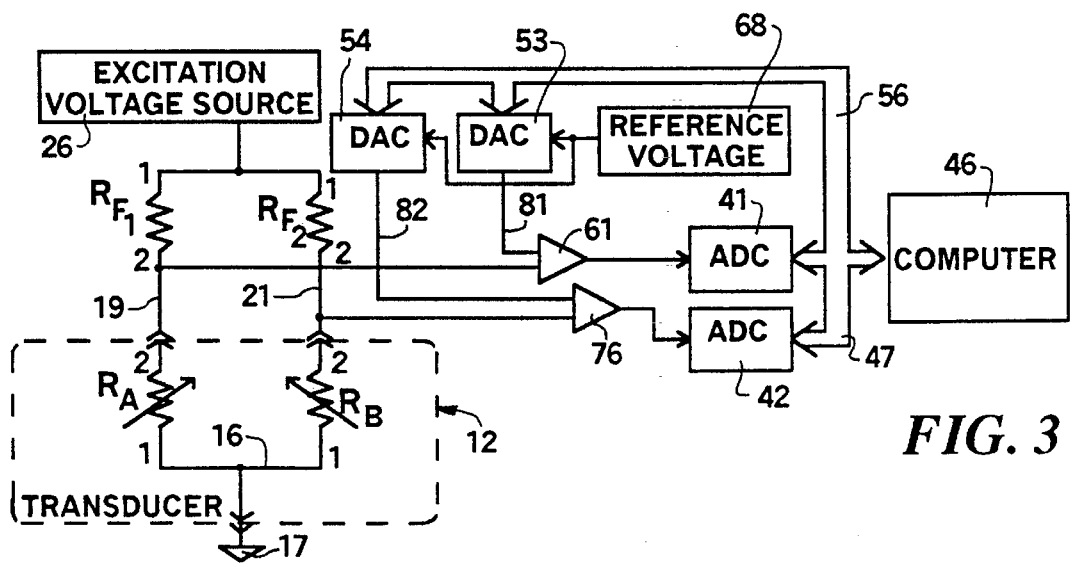
FIG. 3 is a schematic block diagram of still another modified bridge circuit showing an alternative circuit and method to accomplish the results achieved in the circuit shown in FIG. 2.

Alternatively, as shown in FIG. 3, compensation is provided by varying the amplifier reference voltages to match the transducer offset voltages which are a result of a fixed transducer excitation voltage. To accomplish this, the reference voltage from the reference source 68 is supplied to the digital-to-analog converters 53 and 54 as shown which are under the control of the computer 46 through the communication link 56. The outputs 81 and 82 of the digital-to-analog converters 53 and 54 are connected to the reference inputs of the differential amplifiers 61 and 76 to individually vary the reference voltages thereto. The reference voltage supplied to each differential amplifier is adjusted to match the instantaneous offset and temperature components of the signal from the transducer 12 resulting in the outputs from the differential amplifiers being only the amplified pressure component of the signal. The analog-to-digital resolution requirement would be the same as for the circuitry shown in FIG. 2. Thus, the computer 46 in FIGS. 2 and 3 reads the digitized voltage from the two analog-to-digital converters 41 and 42 and computes the pressure and temperature from that information. Also in the circuitry in FIGS. 2 and 3, the computer 46 provides feedback control to compensate for the deviation from monimal resistance values and temperature characteristics of the transducer 12.

From the foregoing it can be seen that there has been provided a piezoresistive transducer circuitry and method accommodating transducer variables in which compensation techniques are utilized to provide signal dynamic range reduction. This has made it possible to reduce the signal dynamic range into the amplifier and into the analog-to-digital converters permitting the computer to compensate for variability in the variable resistive elements, thereby permitting the computer to compensate for temperature effects on the variable resistive elements. This invention has also made it possible to provide amplifiers and analog-to-digital converters which are less expensive because of the dramatically reduced dynamic range requirements. The present invention makes it possible to utilize transducer resistors which are very insensitive to pressure in comparison to larger predecessors making it possible to utilize pressure transducers having sensitivities ranging from 1.2 to 15 ohms per 1000 ohms per 100 mm of mercury which is an order of magnitude less than provided by a predecessor of larger scale pressure transducers. The resistive transducer elements utilized in the present invention have a construction making it difficult if not impossible to trim the same to exact end values. Also by way of example, such resistive elements have a nominal resistance of 3500 ohms but have a manufactured tolerance which could vary under no pressure conditions from 2500 to 4500 ohms, or roughly plus or minus 33% variation. Such resistive elements are also very sensitive to temperature and each resistive element could increase its resistance by as much as 35% over a 100° C. temperature span. The present invention also makes it possible to overcome another characteristic of such resistive elements in that as the temperature increases the pressure sensitivity decreases. Decrease in pressure sensitivity was found to be as high as 27% over 100° C. temperature span. In the present invention all these undesirable features of the ultraminiature piezoresistive elements have been accommodated.

By overcoming the problems of the ultraminiature piezoresistive pressure transducers, it is possible to provide pressures, for example making pressure measurements at the distal extremity of guide wires having an outside diameter of 0.018" and less and typically 0.014" in diameter. Thus, in making Doppler velocity measurements by an ultrasonic transducer carried by the end of the guide wire it also is possible to measure pressure utilizing the present invention and giving complimentary velocity and pressure information, which can be of great value in the treatment of coronary artery disease. In the present invention it is possible to obtain the pressure variance across lesions occurring in a vessel of the patient. For example if there is a significant pressure gradient on opposite sides of the lesion, this would indicate to the physician that a hemodynamically significant lesion was present. In the guide wire, the ultrasonic Doppler transducer can be mounted on the distal extremity so that it would be looking forward from the tip of the guide wire. The pressure transducer of the present invention could be disposed proximal of the ultrasonic transducer making it possible during an angioplasty procedure to measure the velocity distal to a stenosis then measure the pressure gradient across the lesion by manipulating the guide wire distally and proximally to obtain pressure measurements proximal to and distal to the lesion without having to cross or recross the lesion with the tip of the guide wire. The tip of the guide wire would always be distal of the lesion.

What is claimed:

1. Pressure transducer circuitry accommodating pressure transducer variables for making pressure measurement in a living body comprising a microminiature piezoresistive pressure transducer having first and second variable resistive elements, the pressure transducer being characterized as having a pressure sensitivity ranging from 1.2 to 15 ohms per 1,000 ohms per 100 millimeters of mercury, each having first and second ends, circuitry coupled to the first and second variable resistive elements of the transducer including third and fourth fixed resistive elements external of the transducer and of known values, each having first and second ends, means for connecting the first ends of the first and second resistive elements, means for connecting the second ends of the first and third resistive elements to form a first junction, means for connecting the second ends of the second and fourth resistive elements to form a second junction, means for supplying excitation to the first ends of the third and fourth resistive elements, first amplifier means having an input coupled to the means for connecting the second ends of the first and third resistive elements, second amplifier means having an input coupled to the means for connecting the second ends of the second and fourth resistive elements, a first analog-to-digital converter having an input coupled to the output of the first amplifier means, a second analog-to-digital converter having an input coupled to the output of the second amplifier means, said analog-to-digital converters having independent outputs with digitized voltages thereon having a pressure component and a temperature component and computer means coupled to the outputs of the first and second analog-to-digital converters for ascertaining the unknown resistances of the first and second variable resistive elements as independent variable resistance elements in solving a set of equations having said first and second variable resistance elements as unknowns and pressure and temperature as the remaining unknowns to provide a temperature compensated pressure value as measured by the microminiature pressure transducer.

2. Circuitry as in claim 1 wherein each of said first and second resistive elements has independent undesired characteristics including deviation from nominal resistance values and temperature characteristics resulting in offset voltages at the inputs of said first and second amplifier means, said circuitry further including feedback control means controlled by the computer coupled through the third and fourth fixed resistive elements to the first and second variable resistive elements of the transducer for compensating for the offset voltage resulting from the resistance and temperature characteristics of the first and second variable resistive elements of the transducer.

3. Circuitry as in claim 1, wherein said means for supplying excitation to the first ends of the third and fourth resistive elements includes excitation means for supplying a fixed excitation voltage to each of the first ends of the third and fourth resistive elements.

4. Circuitry as in claim 1 wherein said first and second amplifier means are comprised of first and second independent and separate amplifiers.

5. Piezoresistive pressure transducer circuitry accommodating transducer variables comprising a microminiature pressure transducer having first and second variable resistive elements, each having first and second ends, circuitry coupled to the first and second variable resistive elements of the transducer including third and fourth fixed resistive elements each having first and second ends, means for connecting the first ends of the first and second resistive elements, means for connecting the second ends of the first and third resistive elements, means for connecting the second ends of the second and fourth resistive elements, means for supplying excitation to the first ends of the third and fourth resistive elements, first amplifier means having an input coupled to the means for connecting the second ends of the first and third resistive elements, second amplifier means having an input coupled to the means for connecting the second ends of the second and fourth resistive elements, a first analog-to-digital converter having an input coupled to the output of the first amplifier means, a second analog-to-digital converter having an input coupled to the output of the second amplifier means, said analog-to-digital converters having outputs with digitized voltages thereon, a computer, means coupling the computer to the outputs of the first and second analog-to-digital converters so that the computer reads the digitized voltages and computers the pressure therefrom each of said first and second resistive elements having independent undesired characteristics including deviation from nominal resistance values and temperature characteristics resulting in offset voltages at the inputs of said first and second amplifier means and further including feedback control means controlled by the computer coupled to the first and second variable resistive elements of the transducer for compensating for the offset voltages resulting from the resistance and temperature characteristics of the first and second variable resistive elements of the transducer, said first and second amplifier means including first and second differential amplifiers, each having a reference input and means for supplying a fixed reference voltage to the reference input of the first and second differential amplifiers, said means for supplying excitation to the first ends of the third and fourth resistive elements including means coupled to the computer for supplying a varying independent excitation voltage to each of the first ends of the third and fourth resistive elements so that the output voltage components of the transducer dependent on temperature and deviation from nominal resistance values will substantially match the fixed reference voltages supplied to the first and second differential amplifiers.

6. Circuitry as in claim 5 wherein said means coupled to the computer for supplying a varying independent excitation voltage includes a first digital-to-analog converter connected to the first end of the third resistive element and a second digital-to-analog converter connected to the first end of the fourth resistive element.

7. Circuitry as in claim 5 wherein said means for supplying a fixed reference voltage to the reference inputs of the first and second differential amplifiers includes a voltage divider network.

8. Piezoresistive pressure transducer circuitry accommodating transducer variables comprising a microminiature pressure transducer having first and second variable resistive elements, each having first and second ends, circuitry coupled to the first and second variable resistive elements of the transducer including third and fourth fixed resistive elements each having first and second ends, means for connecting the first ends of the first and second resistive elements, means for connecting the second ends of the first and third resistive elements, means for connecting the second ends of the second and fourth resistive elements, means for supplying excitation to the first ends of the third and fourth resistive elements, first amplifier means having an input coupled to the means for connecting the second ends of the first and third resistive elements, second amplifier means having an input coupled to the means for connecting the second ends of the second and fourth resistive elements, a first analog-to-digital converter having an input coupled to the output of the first amplifiers means, a second analog-to-digital converter having an input coupled to the output of the second amplifier means, said analog-to-digital converters having outputs with digitized voltages thereon, a computer and means coupling the computer to the outputs of the first and second analog-to-digital converters so that the computer reads the digitized voltages and computes the pressure therefrom, said means for supplying excitation to the first ends of the third and fourth resistive elements including excitation means for supplying a fixed excitation voltage to each of the first ends of the third and fourth resistive elements, said first and second amplifier means including first and second differential amplifiers, each having a reference input means coupled to the computer for supplying a varying independent reference voltage to each reference input to the first and second differential amplifiers to substantially match the offset voltage and temperature characteristics of the first and second variable resistive elements.

9. Circuitry as in claim 8 wherein said means coupled to the computer for supplying a varying independent reference voltage to each reference input to the first and second differential amplifiers includes first and second digital-to-analog converters.

10. A method for utilizing circuitry with a microminiature piezoresistive pressure transducer for making pressure measurements in a living body in which the transducer is characterized as having a pressure sensitivity ranging from 1.2 to 15 ohms per 1,000 ohms per 100 millimeters of mercury and is provided with first and second variable resistive elements, each having first and second ends, circuitry coupled to the first and second resistive elements including third and fourth fixed resistive elements each having first and second ends, means for connecting the second ends of the first and third resistive elements to form a first junction, means for connecting the second ends of the second and fourth resistive elements to form a second junction, and means including a computer supplying excitation voltages to the first ends of the third and fourth resistive elements so that first and second analog signals appear respectively on the first and second junctions, the method comprising amplifying the first and second analog signals to provide first and second amplified analog signals, converting the first and second amplified analog signals to first and second digital signals and supplying the first and second digital signals to the computer and then utilizing the computer to ascertain the unknown resistances of the first and second variable resistive elements as independent variable resistive elements in solving a set of equations having said first and second variable resistive elements as unknowns and pressure and temperature as the remaining unknowns to provide a temperature compensated pressure value being measured by the microminiature pressure transducer.

11. A method as in claim 10 for reducing the requirements of the dynamic range in converting the first and second amplified analog signals to first and second digital signals where the first and second variable resistive elements have independent undesired characteristics including deviation from nominal resistance values and temperature characteristics, the method further including the steps of using first and second differential amplifiers having references for amplifying the first and second analog signals, supplying an offset voltage to each of the references of the differential amplifiers, ascertaining the temperature of the transducer and adjusting the outputs of the first and second differential amplifiers so that the outputs only reflect the pressure being measured by the transducer.

12. A method as in claim 11 wherein adjusting the outputs of the first and second differential amplifiers includes the step of varying independently the excitation voltages to the first ends of the third and fourth fixed resistive elements to compensate for the offset voltages and for the temperature characteristics of the first and second variable resistive elements.

13. A method as in claim 11 further including the steps of utilizing digital-to-analog converters for connecting the computer and the reference voltage to the first ends of the third and fourth fixed resistive elements.

14. A method as in claim 11 further including the steps of utilizing digital-to-analog converters for connecting the computer and the reference voltage to the differential amplifiers for providing the references for the differential amplifiers.

15. A method for utilizing circuitry with an microminiature piezoresistive pressure transducer for making pressure measurements in a living body in which the transducer is provided with first and second variable resistive elements, each having first and second ends, said first and second variable resistive elements having independent undesired characteristics including deviation from nominal resistance values and temperature characteristics, circuitry coupled to the first and second resistive elements including third and fourth fixed resistive elements each having first and second ends, means for connecting the second ends of the first and third resistive elements to form a first junction, means for connecting the second ends of the second and fourth resistive elements to form a second junction, means including a computer supplying excitation voltages to the first ends of the third and fourth resistive elements so that first and second analog signals appear respectively on the first and second junctions, the method comprising amplifying the first and second analog signals by the use of first and second differential amplifiers having references, converting the first and second amplified analog signals to the first and second digital signals, supplying the first and second digital signals to the computer, utilizing the computer to calculate the pressure being measured by the transducer, causing the computer to control the circuitry to compensate for the offset voltages resulting from the resistance and temperature characteristics of the first and second variable resistive elements of the transducer by varying independently the references utilized during amplification of the first and second analog signals.

* * * * *